United States Patent
Pawelzik et al.

[11] Patent Number: 5,558,128
[45] Date of Patent: Sep. 24, 1996

[54] ONE-HOLE MOUNT MIXING FAUCET

[75] Inventors: Manfred Pawelzik, Soest; Max Derr; Dieter Kahle, both of Iserlohn, all of Germany

[73] Assignee: Friedrich Grohe Aktiengesellschaft, Hemer, Germany

[21] Appl. No.: 427,212

[22] Filed: Apr. 24, 1995

[30] Foreign Application Priority Data

May 5, 1994 [DE] Germany .................... 44 15 797.5

[51] Int. Cl.$^6$ .................. E03C 1/04; F16K 27/04
[52] U.S. Cl. .................. 137/801; 4/677; 137/359; 137/625.17
[58] Field of Search .................... 4/677; 137/359, 137/625.17, 801; 285/321

[56]         References Cited
             U.S. PATENT DOCUMENTS

| 682,250 | 9/1901 | Glauber | 285/321 X |
|---|---|---|---|
| 3,782,417 | 1/1974 | Moen | 137/625.17 |
| 4,848,395 | 7/1989 | Krippendorf | 137/359 |

FOREIGN PATENT DOCUMENTS

| 0293655 | 12/1988 | European Pat. Off. . |
|---|---|---|
| 3332773 | 4/1985 | Germany . |
| 8501282 | 7/1986 | Germany . |
| 9304056 | 6/1993 | Germany . |

*Primary Examiner*—Gerald A. Michalsky
*Attorney, Agent, or Firm*—Herbert Dubno; Andrew Wilford

[57]            ABSTRACT

A plumbing fixture has a housing defining a chamber and having a bottom wall forming an upper surface and formed with at least one inlet port opening at the upper surface. A cartridge assembly in the chamber having a bottom surface directly confronting the bottom-wall upper surface is formed with an inlet port opening on the bottom surface in line with the bottom-wall inlet port. An inlet conduit having an end fitting extending through the inlet port and into the inlet port is formed with an outwardly open circumferential groove generally level with the surfaces. A split and spreadable snap ring fitted to the groove bears on the floor. One of the ports closely surrounds the snap ring and prevents it from spreading and a seal ring engages around the end fitting in the inlet port of the cartridge assembly.

11 Claims, 2 Drawing Sheets

5,558,128

ONE-HOLE MOUNT MIXING FAUCET

FIELD OF THE INVENTION

The present invention relates to a plumbing fixture. More particularly this invention concerns a mixing faucet intended to be mounted on a single hole in a counter, wall, or the like.

BACKGROUND OF THE INVENTION

A standard mixing faucet has a housing that can be fixed to a countertop or the like and that is connected through the countertop to the pressurized hot- and cold-water supply lines and that carries a spout. A cartridge in the assembly is connected at respective hot and cold inlet ports to the supply lines and to the spout so that this cartridge can be operated, typically by a lever, to change the mix of hot and cold water and to vary the volume of flow from the spout.

In a one-hole mounting system, which is typically used in a single-control faucet, the normally flexible supply lines projecting from the bottom of the housing must be painstakingly threaded through the single mounting hole before the housing is fixed to the upper surface of the counter. This can be fairly difficult and precludes putting usably large connectors on the inlet ends of the supply line, and even mandates the use of relatively skinny supply lines.

OBJECTS OF THE INVENTION

It is therefore an object of the present invention to provide an improved one-hole mount plumbing fixture.

Another object is the provision of such an improved one-hole mount plumbing fixture which overcomes the above-given disadvantages, that is which can easily be mounted even though the supply lines are relatively thick and have relatively large input fittings.

SUMMARY OF THE INVENTION

A plumbing fixture has according to the invention a housing defining a chamber and having a bottom wall forming an upper surface and formed with at least one inlet port opening at the upper surface. A cartridge assembly in the chamber having a bottom surface directly confronting the bottom-wall upper surface is formed with an inlet port opening on the bottom surface in line with the bottom-wall inlet port. An inlet conduit having an end fitting extending through the inlet port and into the inlet port is formed with an outwardly open circumferential groove generally level with the surfaces. A split and spreadable snap ring fitted to the groove bears on the floor. One of the ports closely surrounds the snap ring and prevents it from spreading and a seal ring engages around the end fitting in the inlet port of the cartridge assembly.

Thus with this arrangement the faucet is installed by mounting the housing alone, not with the cartridge assembly or inlet conduit, on the countertop or other support member. Then the inlet conduit is inserted up through the hole in the countertop and anchored in place with the snap ring. The cartridge assembly is then installed to prevent the snap ring from spreading, thereby locking the conduit in place. With this arrangement it is therefore possible to use relative thick conduits and to provide their inlet ends with standard-size nuts that would barely even pass through the single mounting hole.

According to the invention the one port closely surrounding the snap ring is the port of the cartridge assembly. Alternately it could be the port of the floor. Either way the ring-retaining port is formed with a cylindrical enlarged portion closely snugly surrounding the snap ring and preventing same from spreading. In addition to facilitate slipping the end fitting through the snap ring, it has a tapered end adapted to fit through the snap ring. The seal ring sits on the snap ring and the conduit is a flexible hose.

The snap ring according to the invention is made of plastic, typically a hard resin like nylon. It is formed with a radially throughgoing split. More particularly, it is annular and is formed radially opposite its split with a radially open cutout forming a thin hinge web.

The plumbing fixture wherein the cartridge assembly includes a manifold plate forming the bottom surface and sitting directly on the floor and a cartridge sitting on the manifold plate. Means is provided for clamping the plate and cartridge down on the upper surface of the floor.

BRIEF DESCRIPTION OF THE DRAWING

The above and other objects, features, and advantages will become more readily apparent from the following description, reference being made to the accompanying drawing in which:

FIG. 6 is a large-scale view of a detail of FIG. 2; and

FIG. 7 is a view like FIG. 6 but showing an alternative structural detail.

SPECIFIC DESCRIPTION

Figure 1:
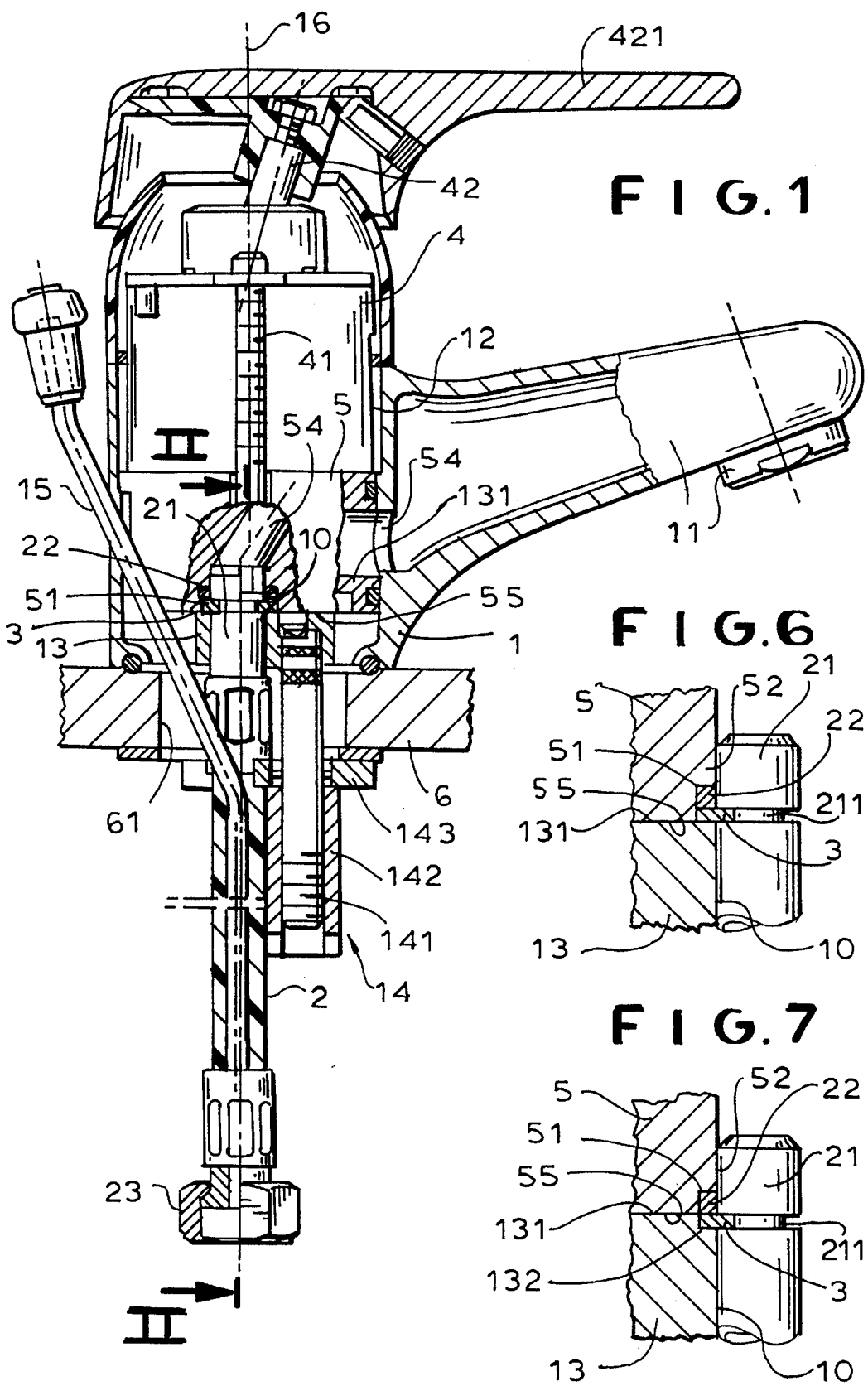
FIG. 1 is a vertical section through the plumbing fixture according to the invention.
Figure 2:
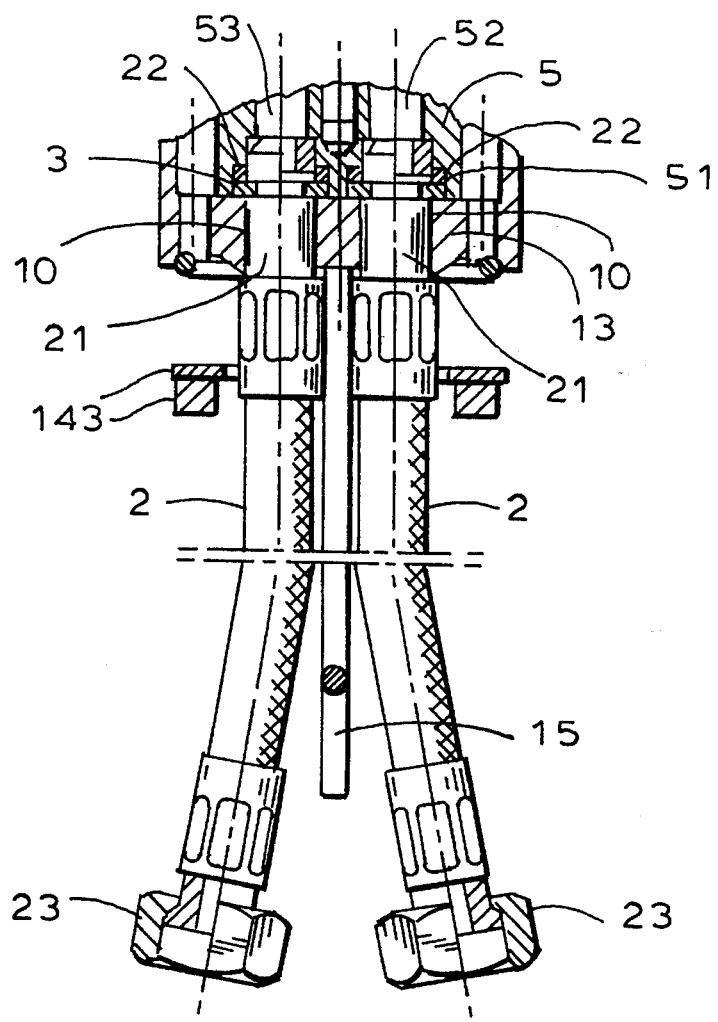
FIG. 2 is a section taken along line II—II of FIG. 1.

As seen in FIGS. 1 and 2 a one-hole mixing valve according to the invention has a housing 1 defining a chamber 12 and having a bottom wall or floor 13 with a planar upper surface 131. A basically cylindrical valve cartridge 4 sits via a manifold plate 5 having a planar lower surface 55 atop the surface 131 with screws 41 secured in the floor 13 holding the assembly formed by the cartridge 4 and plate 5 in place on the floor 13. The floor 13 is formed with a pair of cylindrical and axially throughgoing inlet holes or ports 10 aligned with respective inlet ports 52 and 53 of the plate 5. Another passage 54 in the plate 5 leads to a spout or nozzle assembly 11 formed on the housing 1. As described below hot and cold water under pressure are supplied through the ports 52 and 53 to the cartridge 4. This cartridge 4 is of the standard ceramic-disk type and has an actuating stem 42 that can be twisted about an axis 16 by a handle 421 to vary the temperature of the water exiting the spout 11 and can be tipped about a horizontal axis perpendicular to the plane of the view of FIG. 1 to vary the volume of output flow.

The housing 1 sits atop a countertop or other surface member 6 formed with a single hole 61. A mounting assembly 14 comprising at least one screw 141 threaded into the bottom of the floor 13 and carrying a nut 142 bearing via washers 143 on the underside of the member 6 secures the housing 1 in place. A lift-type drain-control rod 15 extends up through the hole 61 and out the back of the housing 1, the lower end of this rod 15 being connected to an unillustrated drain valve.

Figure 3:
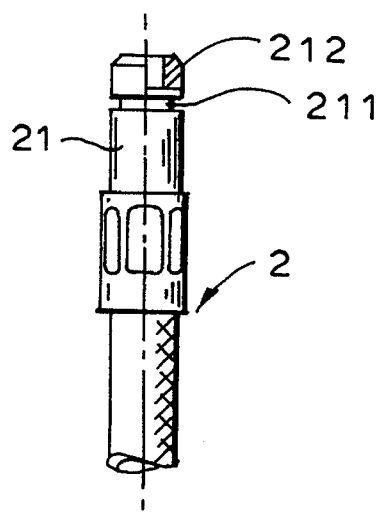
FIG. 3 is a detail view of a connector-tube end.

A pair of hoses 2 respectively connected to unillustrated pressurized hot- and cold-water supply lines have input couplings 23 at their upstream ends and outlet fittings 21 at their opposite ends. As also shown in FIGS. 3 and 6 these outlet fittings 21 are each formed with a square-section and outwardly open circumferential groove 211 and have beveled ends 212. The ports 52 and 53 are dimensioned to receive the ends of the fittings 21 snugly but have enlarged portions 51 which extend to the face 55 and which each receive an O-ring 22 on top of a snap ring 3. Alternately as shown in FIG. 7 the floor 131 is formed in the hole 10 at the surface 131 with an enlarged portion 132 receiving the snap ring 3.

Figure 4:
FIG. 4 is a large-scale section through the mounting washer.
Figure 5:
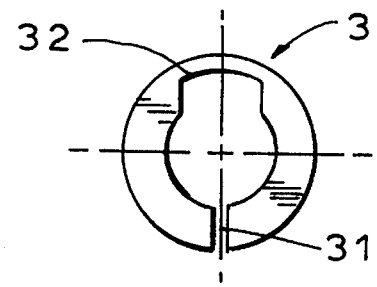
FIG. 5 is a top view of the mounting washer.

As shown in FIGS. 4 and 5 the snap rings 3 are each made of a durable plastic and each are of standard cylindrically annular shape. One side is formed with a throughgoing slot 31 and the diametrally opposite side with a cutout 32 allowing the ring 3 to spread like a hinge by bending in the middle of the thin web left by the cutout 32. The enlarged end portions 51 of the ports 52 and 53 are of cylindrical shape and of an inside diameter equal to or slightly larger than the outside diameter of the ring 3.

Thus in order to install the valve according to the invention the housing 1, which does not have the cartridge assembly 4, 5 mounted in it, is seated atop the support member 6 over the hole 61. Then the mounting assembly 14 is installed to secure the housing 1 solidly in place.

The hoses 2 are fitted up through the hole 61 so that their end fittings 21 fit through the respective holes 10 in the floor 13, leaving the grooves 211 just level with the surface 131. Then the two washers 3 are slipped on and snapped into place in the grooves 211, which is made easier by the beveled ends 212.

The plate 5 is then fitted over the ends of the fittings 21 so that same engage into the respective ports 52 and 53 and the O-rings 22 in these ports 52 and 53 engage snugly around the fittings 21. The enlarged portions 51 fit snugly around the outer peripheries of the washers 3 which effectively prevents them from spreading and locks the hoses 4 in place. The screws 41 are then installed to ensure that the hoses 2 remain fixed in position.

We claim:

1. A plumbing fixture comprising:
    a housing defining a chamber and having a bottom wall forming an upper surface and formed with at least one inlet port opening at the upper surface;
    a cartridge assembly in the chamber having a bottom surface directly confronting the bottom-wall upper surface and formed with an inlet port opening on the bottom surface in line with the bottom-wall inlet port;
    an inlet conduit having an end fitting extending through the bottom-wall inlet port and into the cartridge-assembly inlet port and formed with an outwardly open circumferential groove generally level with the surfaces;
    a split and spreadable snap ring fitted to the groove and bearing on the floor, one of the ports closely surrounding the snap ring and preventing same from spreading; and
    a seal ring engaged around the end fitting in the cartridge-assembly inlet port.

2. The plumbing fixture defined in claim 1 wherein the one port closely surrounding the snap ring is the port of the cartridge assembly.

3. The plumbing fixture defined in claim 1 wherein the one port closely surrounding the snap ring is the port of the floor.

4. The plumbing fixture defined in claim 1 wherein the one port is formed with a cylindrical enlarged portion closely snugly surrounding the snap ring and preventing same from spreading.

5. The plumbing fixture defined in claim 1 wherein the end fitting has a tapered end adapted to fit through the snap ring.

6. The plumbing fixture defined in claim 1 wherein the seal ring sits on the snap ring.

7. The plumbing fixture defined in claim 1 wherein the conduit is a flexible hose.

8. The plumbing fixture defined in claim 1 wherein the snap ring is of plastic.

9. The plumbing fixture defined in claim 1 wherein the snap ring has a radially throughgoing split.

10. The plumbing fixture defined in claim 9 wherein the snap ring is annular and is formed radially opposite its split with a radially open cutout forming a thin hinge web.

11. The plumbing fixture defined in claim 1 wherein the cartridge assembly includes
    a manifold plate forming the bottom surface and sitting directly on the floor and
    a cartridge sitting on the manifold plate, the fixture further comprising
    means for clamping the plate and cartridge down on the upper surface of the floor.

* * * * *